INVENTOR
Olof Arvid Skantze
BY Arthur Robert
ATTORNEY

Patented May 27, 1952

2,598,313

UNITED STATES PATENT OFFICE 2,598,313

METHOD AND AN APPARATUS FOR THE TRANSFORMATION OF CEREALS, PARTICULARLY BARLEY, INTO MALT

Olof Arvid Skantze, Falkenberg, Sweden

Application February 13, 1948, Serial No. 8,056
In Sweden February 14, 1947

12 Claims. (Cl. 195—70)

This invention relates to a method and an apparatus for the transformation of cereals, particularly barley into malt.

It is known since olden times that cereals, particularly barley, are transformed into malt by subjecting the dry barley to three steps of treatment following each other and called steeping, germination and drying.

The steeping comprises the soaking of the barley in water with the purpose of letting the grains soak up so much water (45%) that they begin to germinate. In this step the barley is placed in a large batch of 5000 kilos in an open tub with water, through which there is blown air in order to keep the grains moving and to ventilate and wash them. After some time the mixture is pumped over into a new tub with pure water, the water of the first tub under the way being led off as slurry. The process is repeated in still one or more tubs in the same way, until the barley after three days has absorbed sufficient water.

The germination step aims at letting the soaked barley germinate. This takes place by spreading the barley, after its being released from free water, on the floor, where it will germinate. At certain intervals, about 12 hours, the barley must, however, be turned manually or mechanically in order to prevent same from germinating in lumps or cakes. If lumps form the temperature can then rise, so that the germination takes place too fast, which is not desirable, the turning therefore also having the purpose of airing the barley and diminishing the temperature.

Instead of the so called floor malting there is also used the more modern so called "pot-drum" malting, according to which the barley, released from free water, is introduced into a horizontal cylinder, a so called drum in which it may germinate. The drum is a closed vessel in which the barley rests on a perforated bottom. The drum is rotated a few times at certain intervals to prevent said lumping of the grains. An air conduit introducing air with a controllable content of humidity and temperature leads to the drum, the air being let in under the perforated plate, then being made to pass through the batch of barley, which, when it begins to grow, is called malt, and then let out.

After the germination, which can be divided into a growing time of about 4 days and a so called solution time of 4 days, the barley has turned into so called green malt having a content of humidity of about 45%.

The kiln-drying relates to a method of drying by which the green malt is dried, until its content of humidity is about 3%. This method aims at making the malt suitable for storage.

The kiln-drying is carried out in such a manner that the total amount of the green malt is introduced into a vertical shaft having perforated side walls, through which there is blown dry and hot air, until the malt has obtained the desired dryness, when the kiln is emptied and the malt is ready to be stored or sold.

The production of malt out of barley according to the prior practice described above takes place in large batches of 5000 kilos each, which must intermittently run through the various steps of treatment and meanwhile requires a great amount of manual attendance. As the various periods of treatment require different times of treatment, this means, in addition, that pauses of considerable lengths occur in certain periods, which take a shorter time for a batch than others, inasmuch as for instance large accommodations are not available for the floor malting or a number of drums can be used serving the same steeping arrangements. Such a duplication of a certain part of the arrangements make the plant more expensive. The costs of a malting plant are thus very great as well as the costs of working it.

This invention has as its object to provide an improved method for the production of malt from cereals.

Another object is to reduce the requirement of human labour for production of malt.

Another object is to provide a method for production of malt of such a kind that the steeping of the dry cereals occurs while the cereals are transported in a continuous flow through an apparatus suitable for the purpose.

A further object is to provide a method for production of malt of such a kind that the steeping, germination and drying of the cereals occur in the mentioned succession in a continuous current.

Another object of the invention is to provide an apparatus for carrying out the method of steeping the cereals in a continuous current.

Other objects and advantages of the invention will appear as the following description is read in connection with the accompanying drawings.

Figure 1:
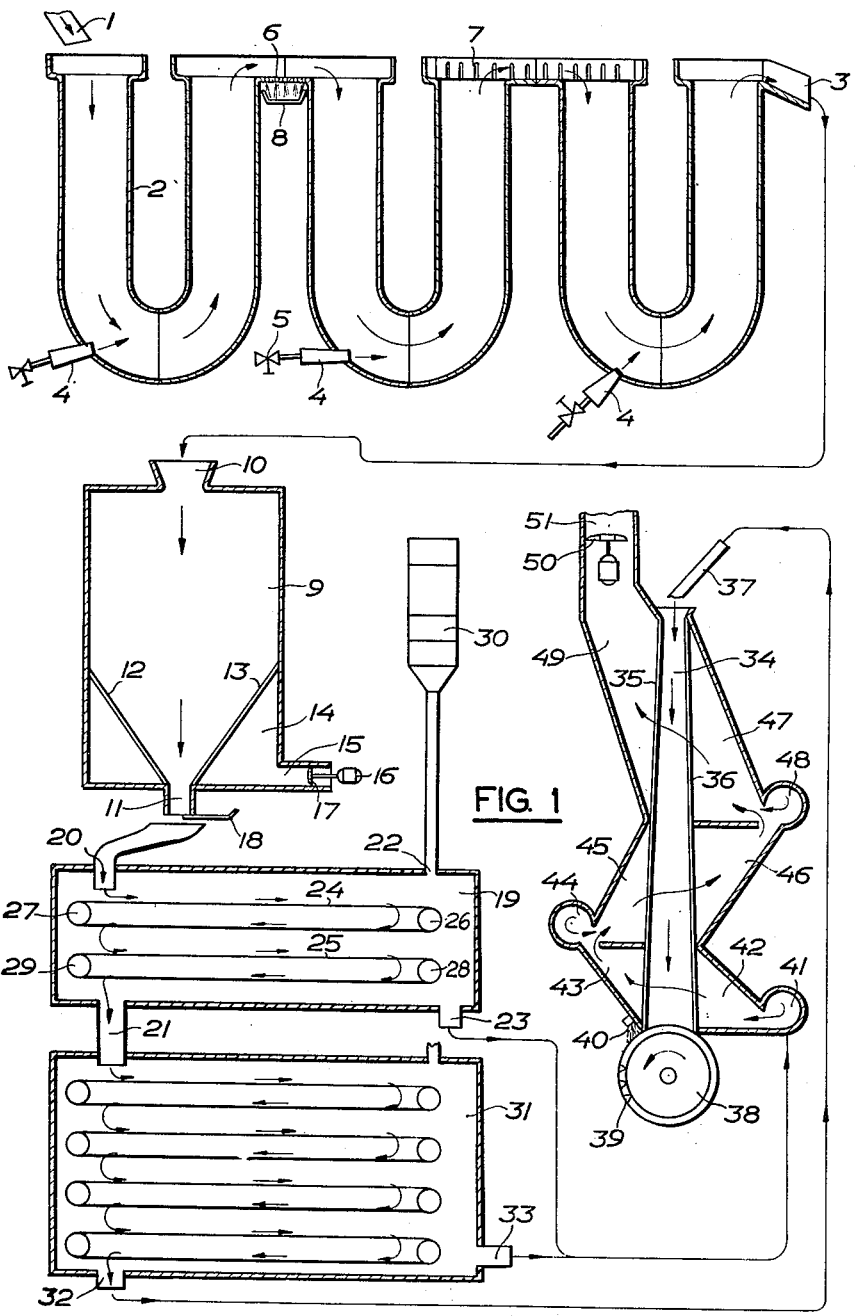
Figure 1 is a diagrammatical sectional view of an embodiment of an apparatus for execution of the method according to the invention.

It must particularly be observed that the various apparatus shown in Figure 1 are not to scale.

In the drawing, 1 designates a pipe for the introduction of barley in a continuous flow in an apparatus for the moistening of the barley, the so called steeping.

The steeping apparatus consists of a series of U-shaped pipes 2 being connected to each other in series. Each pipe has its pipe bend turned downwards and the open ends of its shanks turned upwards. A great number of U-pipes may be used. The last U-pipe is provided with a special outlet 3. The pipes are from the beginning filled with water and communicate at their upper ends in the manner shown in the figure. Into each pipe bend there is inserted an injector 4 for the introduction of water and/or air. Several injectors may be placed in each pipe bend. Each injector is provided with a regulating valve 5.

When the barley is continuously fed into one shank of the first U-shaped pipe it falls down through the water to the bottom of the pipe bend. By the injectors the barley is set moving in the water and is driven up through the other shank of the same pipe in a continuous current. If the injector works with water, the quantity of water in the pipe is increased, which is of importance for the passing over of the mixture of water and barley into the next U-pipe. If the injector works with air only, the water may be fed continuously into the U-pipe in question through a special pipe in another way. Thus it is the purpose of the injector to supply air and/or water and to serve as driving means for the continuous moving forward of the barley through the apparatus. The air escapes through the open pipes and the excess amount of water—the slurry—is evacuated through holes 6 at the bottom—or holes 7 in the side walls of the connecting channels between the shanks of the successive U-pipes. This slurry is led away by means of drain pipes 8 or in any other manner. The injectors 4 may be substituted by other driving devices for the transport of the barley. The process is repeated from one U-pipe to the other, which all takes a time of about 3 days, until the barley when ready steeped is discharged in a continuous stream through the outlet 3. The driving means are all preferably adjustable so that the period, during which the barley passes through the apparatus, may be adjusted according to the requirements. Once the apparatus has been set, it scarcely requires any attendance but works automatically. When the barley leaves the outlet 3 the free water or part of it may be separated from the barley by holes at the bottom of outlet 3, while the barley falls down in a continuous stream into the dry steeping chamber 9.

The dry steeping chamber comprises a vertical chamber 9 having an intake 10 and an outlet 11. At the bottom of the chamber there are a number of obliquely placed perforated plates or baffles 12, 13 separating a lower chamber 14 from the chamber proper, this lower chamber being provided with an outlet 15 for air and water and a motor 16 driving a sucking fan 17 or any other sucking device. The outlet 11 for the grain is provided with an adjustable sliding damper 18 or any other choking device, which is adjusted (after sufficient barley has accumulated in the chamber 9 at the start of the process) to allow a continuous flow through outlet 11 at the same rate that barley enters through inlet 10. In its slow travel through the chamber 9 part of the free water runs off through the perforations in plates 12, 13 and escapes through the outlet 15 or any other outlet for the water may be provided. Meanwhile the fan 17 sucks in air through the intake 10 or another special intake not shown, which air passes through the barley and escapes through the perforations in baffles 12, 13 and outlet 15 together with carbonic acid formed in the barley. Thus the passage of the barley through the dry steeping chamber occurs totally automatically and continuously and requires but little attendance. The passage of the barley through this chamber takes about 2½ days. The barley is now ready to be passed on to the germination chamber, into which it falls down direct from outlet 11 in a continuous stream.

The germination chamber consists of a chamber 19 provided with an upper intake 20 and a lower outlet 21 for the malt as well as an intake 22 and an outlet 23 for air. In chamber 19 there are two endless steel bands 24 and 25, respectively, running over driven wheels 26 and 27, 28 and 29, respectively. The barley falls first down on the upper horizontal part of the band 24, where it is spread in a suitable even layer by means of stripping rulers more fully described hereinafter, while the band is transported towards the wheel 26. Just in front of the wheel 26 there is a stripping member more fully described hereinafter, which strips the barley from one or both sides of the band down into a falling pipe, which will also be more fully described below. The falling pipe or pipes lead the barley down on the upper side of the lower horizontal part of the same band, where it will be spread again on the band by a ruler and fed on. Just in front of the wheel 27 it meets a new stripping member with a falling pipe which conveys the malt to the upper horizontal part of the band 29 etc., this process being repeated until the malt is introduced into a falling pipe leading to the outlet 21 by the last stripping member. The bands are of great lengths and move very slowly with adjustable speed, so that the malt passes through the germination chamber in about two days during a continuous transport through the chamber. The germination or growing is completed in this chamber. In order that the germination may take place in the desired manner and the rootlets not grow too big, the malt is during its passage through the chamber subjected to an atmosphere decreasing the temperature and affecting the humidity of the malt, in case this should be necessary. This atmosphere is obtained by introducing air through the intake 22, after the air first having been treated in desired respects in an air conditioning unit 30. The used up air escapes through the outlet 23, and if desired it is let away by means of a sucking fan or the like. The escaping air has then assumed a comparatively high temperature. In certain cases the air entering the intake 22 is through pipings 60, 61 (Figure 2) leading to said falling pipes, and is blown through the malt when this passes the falling pipes. The falling pipes and the transport of the malt from one band or another has the purpose of stirring the grains so that they do not germinate in lumps. This is partly also the object of the stripping members. The passage of the malt through the germination chamber is continuous and its treatment there is carried out fully automatically. From the germination chamber the malt is transferred continuously to the modifying chamber. This chamber may be formed in one with the germination chamber or separated from it and placed directly under the germination chamber, so that the malt from the outlet 21 of the germination chamber may fall continuously into the modifying chamber; or the modifying chamber may be located beside the germination chamber, in which case the malt may be transported continuously from outlet 21 to the modifying chamber by means of special conveying means acting continuously and known per se.

The modifying chamber consists according to Figure 1 of a chamber 31 totally equal to the germination chamber 19 in all respects but slightly larger and having a greater number of endless bands. The transport of the malt within the chamber is also carried out in the same way and the treatment with air is substantially the same, though the condition of the air may be somewhat different. The same unit 30 may also serve the chamber 31, though this has not been shown by any piping in order not to complicate the figure. The outlet for the malt of chamber 31 is designated by 32 and its outlet for air with 33. The bands move also very slowly in this chamber, and the malt passes the chamber by moving continuously in about 4 days. The passage through the chamber 31 and the treatment of the malt in same takes place fully automatically. When the malt or green malt as it is called after having passed pipe 21, leaves outlet 32, it contains 45% humidity, which must be diminished to get the malt suitable for storage. Therefore the green malt is by means of suitable conveyors acting continuously transferred in a continuous stream to a drying device, the so called kiln.

The kiln consists according to Figure 1 of a vertical shaft 34 being rectangular in cross section and having its two big side walls made of perforated plates 35, 36. The malt is introduced in a continuous stream through the pipe 37, and after accumulation of a column of sprouted barley at the start, the dried barley is discharged in a continuous stream. The shaft is smaller in cross section at its upper end than at its lower end which has the purpose of preventing the column of green malt moving continuously through the shaft from getting stuck in the shaft, and instead of letting the continuously moving column easily travel to the bottom of the shaft. The bottom of the shaft consists of a roll 38 being kept rotating constantly. The surface of the roll is provided with recesses 39 or pockets which are filled by the malt grains in the shaft which grains then automatically follow the roll under its movement and are emptied from the recesses outside the shaft where the malt is collected for preservation and storage. A packing device for instance in the form of a brush ring 40 may be arranged between the roll and the lower opening of the shaft. Instead of the roll another arrangement for discharging of the malt may be used, for instance a sliding member or the like.

In order to dry the green malt during its passage through shaft 34 hot and more or less dry air is led through the shaft. The hot air is by means of a fan 41 or the like pushed into a chamber 42 and from this through the lower part of shaft 34 into a chamber 43. From the chamber 43 the air is, while dry fresh air is added, by means of a fan 44 driven into chamber 45 and then back again through the shaft and into chamber 46, from the latter the air is conveyed into chamber 47, while still more dry fresh air is added by means of a fan 48. From chamber 47 the air passes once more through shaft 34 and into chamber 49, from which the air by means of a motor driven fan 50 is driven out through outlet 51. The passage of the malt through the shaft takes place in a column countercurrent to the hot air, the temperature of which sinks at each passage owing to the addition of fresh air. The addition of the various quantities of air is adjustable as well as the temperature of the air. The kiln works fully automatically and continuously.

In order to cool down the malt escaping from the kiln and to utilize the heat which the malt possesses, it is possible to let the malt pass between two perforated plates and lead air through them and connect this cooling apparatus with the sucking side of fan 41.

The outlets 23 and 33 can, instead of being used to convey air for the preheating of the air to the kiln, be connected directly to the air conditioning unit 30 as a return pipe, so that in this way heat may be regained, and the content of carbonic acid in the solution chamber 31 be regulated.

All the separate apparatus comprised in the apparatus described work according to the principle of letting the barley be fed in a continuous path into the divisional apparatus and passes through and leaves same under the same conditions. If, as has been described, arrangements are made for the automatic conveyance from one divisional apparatus to the other, the barley passes through the whole apparatus in one continuous stream. By subjecting the barley during its passage through each divisional apparatus to the treatment, for which the apparatus in question is provided, it will, in addition, be obtained that the barley is transformed from barley into ready dry malt in a continuous stream in an apparatus working fully automatically.

Figure 2:
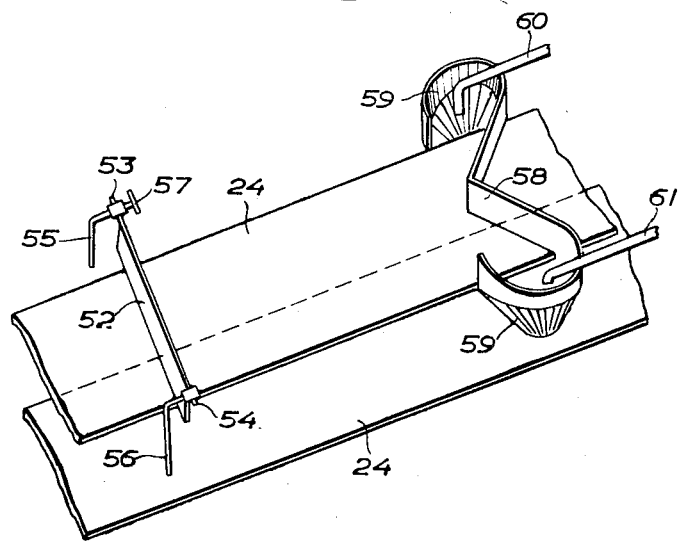
Figure 2 is a perspective view of a detail pertaining to the apparatus in Figure 1 and shown on an enlarged scale.

Figure 2 illustrates a stripping ruler 52 consisting of a plate placed across the conveying band a bit above its surface. The plate is at its end provided with pins 53 and 54, being rotatably mounted in stationary arms 55 and 56. By means of a screw 57 the pin 53 may be locked in various positions of rotation. By rotating the plate 52 in its bearings the lower edge of the plate can be brought into any optional height over the conveying band. The plate will then sweep over the malt being fed on the conveying band and smooth it into a suitable even layer. The stripping ruler may be substituted by any other structure for the purpose.

In addition, Figure 2 shows a stripping member of a plough type, which is placed above the conveying band just in front of one or more of its wheels so that it slightly strips the band. The stripping member is supported by stationary supports not shown. The stripping member guides the malt on both sides of the band when this is moving, so that the malt is conveyed down into a falling pipe 59 on either side of the band. The falling pipes may be supported by the stripping member in the manner shown in Figure 2. From the falling pipes, the upper ends of which are formed into hoppers, the malt is conveyed or falls down onto a conveying band lying underneath, where a smoothing on the band is carried out by stripping rulers of the type described above or of any other type. When passing through the falling pipes the malt is stirred. As has already been stated, pipes 60 and 61, respectively, may end in the hoppers, these pipes leading conditioned air into the malt current and blowing air through said malt current. The pipes 60 and 61 are connected to the unit 30.

The direction of motion of the barley and, in some cases, of the air and the water have been marked by arrows in the drawing.

Without departing from the idea of the invention the various divisional apparatus and the details comprised in these as described hereinbefore may, of course, also have other embodiments.

The conveying bands needs not be steel bands but, for instance, caoutchouc bands having insertions or not, this allowing the pulleys to have a small diameter. In addition the conveying bands may be arranged in other ways, for instance as a single endless band running over breaking pulleys. According to another method the conveying bands may be arranged in such a way that horizontal or substantial horizontal endless bands are arranged one on top of the other but displaced longitudinally in zigzag, so that the malt from the upper band runs round the breaking pulley down onto the upper part of the endless band lying beneath and so on at each end. In this case the malt is aired and stirred during its free fall, and the stripping members and falling pipes become superfluous. Then the air may suitably be blown in jets onto the falling down malt or the malt, when it lies on the band. The conveying bands may between the wheels or breaking pulleys be supported by supporting rolls or wheels or by supporting ribs running along the bands. The conveying bands may be substituted by so called shaking grooves, for instance according to the vibration method. Instead of a sucking fan 17 it is also possible to place a forcing fan at the intake 10. In the unit 30 there is suitably provided a fan as driving means for the air.

Having thus described my invention, what I claim as new and desire to secure by Letters Patent, is:

1. An apparatus for dry steeping of soaked barley comprising, walls forming a vertical chamber and providing an inlet at the upper end of said chamber for the barley coming from the soaking process and an outlet at the lower end thereof for discharge of barley from the chamber, an internal perforated baffle in said chamber for drainage of water from the bulk of the barley, said baffle separating said vertical chamber into a lower chamber provided with an outlet for water and air, a sucking device connected to said lower chamber sucking in air from the outside into the vertical chamber at top thereof through an inlet and through the bulk of the barley and out through said air outlet from the lower chamber simultaneously removing carbonic acid developed by the barley.

2. An apparatus in accordance with claim 1 in which the outlet of the vertical chamber for the barley is provided with an adjustable damper.

3. An apparatus for carrying out the steeping of grains, comprising: a plurality of vertically arranged U-shaped channels having the bends at the lower ends and connected in series; means providing apertures for escape of water between adjacent channels; means to introduce air and water to each U-shaped channel; means to introduce grain into the open end of the first U-shaped channel; and means providing a perforate conduit for conducting away grain from the last U-shaped channel and separating water therefrom.

4. An apparatus for carrying out the steeping of grains, comprising: a plurality of vertically arranged U-shaped channels having the bends at the lower ends; means connecting adjacent upper ends providing an overflow trough for conveying material from one channel to the next adjacent channel, said trough providing apertures for escape of water; means to introduce grain into the open end of the first U-shaped channel; means to introduce air and water to each U-shaped channel; and means providing a perforate trough for conducting away grain from the last U-shaped channel and separating water therefrom.

5. An apparatus for carrying out the steeping of grains comprising: a plurality of vessels, each providing a pair of vertical columns for liquid and grain communicating at the bottom, and arranged in series; means for applying a flowing advance movement to the water and grains in each vessel; means for conducting the overflow from one column to the next adjacent vessel; means to introduce grain into the first vessel; means to introduce air and water to each vessel; and means for conducting away grain from the last vessel of the series and separating water therefrom.

6. An apparatus as specified in claim 3 having means to receive the stream of grains to form them into a moving vertical column; and means for passing air through the drained grain to remove carbonic gas therefrom.

7. An apparatus as specified in claim 6 having a germinating chamber; means for transporting the grains in a layer through the germinating chamber; means forming the sprouted grain into a vertical column and continuing accretion of sprouted grain to one end of the column; and means for passing streams of heated air transverse to said column of grain to dry said sprouted grain.

8. In the process of converting cereal grain to malt, the steps which comprise: introducing a stream of grain into the first of a series of steeping water bodies having communications at their upper ends and over drain portions; flowing the grain stream successively through said bodies of steeping water and discharging it from the last body; directing the grain stream leaving each body, to flow through the next body, to its upper end communication with the next body and over the corresponding drain portion so as to drain steeping water from the grain stream as it passes from one body to the next; and feeding make-up water to each body.

9. The process of claim 8 including: feeding air into each body for aerating purposes.

10. The process of claim 9 including: injecting at least one of said fluids, which are fed to each body, into at least one of said bodies in a direction promoting the flow of the grain stream therethrough.

11. The process of claim 8 including: blowing a stream of air through the grain stream discharged from the last body to remove carbonic gas and surface water therefrom.

12. The process as specified in claim 8 wherein the grain stream flows through each body of steeping water along a U-shaped path.

OLOF ARVID SKANTZE.

REFERENCES CITED

The following references are of record in the file of this patent:

UNITED STATES PATENTS

| Number | Name | Date |
|---|---|---|
| 743,810 | Berg | Nov. 10, 1903 |
| 857,954 | Mey | June 25, 1907 |
| 1,482,812 | Roberts | Feb. 5, 1924 |
| 2,343,706 | Reich | Mar. 7, 1944 |